(12) United States Patent
Luo et al.

(10) Patent No.: US 11,493,697 B2
(45) Date of Patent: Nov. 8, 2022

(54) OPTICAL FIBER ADAPTER

(71) Applicant: Molex, LLC, Lisle, IL (US)

(72) Inventors: Jianfeng Luo, Wuhan (CN); Qin-Han Li, Wuhan (CN); Lily Zhuang, Fremont, CA (US)

(73) Assignee: Molex, LLC, Lisle, IL (US)

( * ) Notice: Subject to any disclaimer, the term of this patent is extended or adjusted under 35 U.S.C. 154(b) by 555 days.

(21) Appl. No.: 16/074,116

(22) PCT Filed: Jan. 26, 2017

(86) PCT No.: PCT/CN2017/072757
§ 371 (c)(1),
(2) Date: Nov. 1, 2020

(87) PCT Pub. No.: WO2017/133642
PCT Pub. Date: Aug. 10, 2017

(65) Prior Publication Data
US 2021/0055482 A1  Feb. 25, 2021

(30) Foreign Application Priority Data

Feb. 1, 2016 (CN) .......................... 201620104803.6

(51) Int. Cl.
*G02B 6/38* (2006.01)
(52) U.S. Cl.
CPC ......... *G02B 6/3825* (2013.01); *G02B 6/3885* (2013.01); *G02B 6/3893* (2013.01)
(58) Field of Classification Search
CPC ...... G02B 6/38; G02B 6/3831; G02B 6/3825; G02B 6/3885; G02B 6/3893
(Continued)

(56) References Cited

U.S. PATENT DOCUMENTS 5,717,801 A * 2/1998 Smiley ................. G02B 6/3831
385/60
5,774,611 A * 6/1998 Nagase ................ G02B 6/3893
385/58
(Continued)

FOREIGN PATENT DOCUMENTS

CN  102269846 A  12/2011
CN  202393946 U  8/2012
(Continued)

OTHER PUBLICATIONS

International Search Report and Written Opinion received for PCT application No. PCT/CN2017/072757, dated May 5, 2017, 7 pages.
(Continued)

*Primary Examiner* — Kaveh C Kianni

(57) ABSTRACT

An optical fiber adapter (10) comprises: a housing (1), a front portion of the housing (1) is provided with at least two accommodating cavities (19) which penetrate in a front-rear direction, are arranged sided by side, and are closed circumferentially, and a rear portion of the housing (1) is provided with a mounting base (14); at least two optical fiber plugs (2) provided on the mounting base (14), each optical fiber plug (2) comprises a positioning member (21), a ferrule (22) fixed to the positioning member (21) and extending forwardly, an optical fiber (23) exposed to a front end of the ferrule (22), a sleeve (24) fitted on an outer periphery of the ferrule (22) and a positioning cylinder (25) further sheathed on an outer periphery of the sleeve (24), a front end of the positioning cylinder (25) extends forwardly into the accommodating cavity (19), a rear end of the positioning cylinder (25) is fixed to the positioning member (21), an outer periphery of the positioning member (21) is provided with a first flange (211); and at least a fixing cover (3) locked on the mounting base (14) of the housing (1), the fixing cover (3) and the mounting base (14) are assembled to form a first latching
(Continued)

groove (4), the first latching groove (4) correspondingly accommodates the first flange (211) of the optical fiber plug (2) and positions the first flange (211) of the optical fiber plug (2). The optical fiber adapter (10) can shorten the size of the rear portion and save the occupied space inside the cabinet.

14 Claims, 10 Drawing Sheets

(58) Field of Classification Search
USPC .......................................................... 385/78
See application file for complete search history.

(56) References Cited

U.S. PATENT DOCUMENTS

| | | | | |
|---|---|---|---|---|
| 5,940,561 | A * | 8/1999 | Dean, Jr. | G02B 6/3825 385/59 |
| 6,254,278 | B1 * | 7/2001 | Andrews | G02B 6/3843 385/53 |
| 6,325,547 | B1 * | 12/2001 | Gammons | G02B 6/3851 385/139 |
| 6,357,931 | B1 * | 3/2002 | Shirakawa | G02B 6/4293 385/75 |
| 6,357,934 | B1 * | 3/2002 | Driscoll | G02B 6/3869 385/59 |
| 6,612,750 | B1 * | 9/2003 | Bull | G02B 6/3825 385/83 |
| 6,619,856 | B1 * | 9/2003 | Lampert | G02B 6/3843 385/59 |
| 9,618,715 | B1 | 4/2017 | Yang et al. | |
| 2005/0213892 | A1 * | 9/2005 | Barnes | G02B 6/3806 385/60 |
| 2009/0148104 | A1 * | 6/2009 | Lu | G02B 6/3826 385/72 |
| 2010/0232756 | A1 | 9/2010 | Hackett | |
| 2011/0229085 | A1 * | 9/2011 | Bradley | G02B 6/3885 29/857 |
| 2012/0219254 | A1 * | 8/2012 | Bradley | G02B 6/3885 29/407.09 |
| 2014/0023322 | A1 | 1/2014 | Gniadek | |
| 2017/0003458 | A1 * | 1/2017 | Gniadek | G02B 6/3885 |
| 2018/0081127 | A1 * | 3/2018 | Coenegracht | G02B 6/3877 |
| 2018/0259717 | A1 * | 9/2018 | Takano | G02B 6/3893 |
| 2019/0170961 | A1 * | 6/2019 | Coenegracht | G02B 6/4472 |
| 2019/0265418 | A1 * | 8/2019 | Gniadek | G02B 6/3821 |
| 2019/0271816 | A1 * | 9/2019 | Wong | G02B 6/3869 |

FOREIGN PATENT DOCUMENTS

| | | | | |
|---|---|---|---|---|
| CN | 201110196128 | | 1/2013 | |
| JP | 2004188580 A | * | 7/2004 | ........... B24B 19/226 |
| JP | 4476901 B2 | * | 6/2010 | |
| KR | 940000836 B1 | * | 2/1994 | |
| WO | 2017/133642 A1 | | 8/2017 | |

OTHER PUBLICATIONS

International Preliminary Report on Patentability received for PCT Application No. PCT/CN2017/072757, dated Aug. 16, 2018, 9 pages.

* cited by examiner

OPTICAL FIBER ADAPTER

RELATED APPLICATIONS

This application is a national stage of International Application No. PCT/CN2017/072757, filed Jan. 26, 2017, which claims priority to Chinese Application No. 201620104803.6, filed Feb. 1, 2016, each of which are incorporated herein by reference in their entirety.

FIELD OF THE PRESENT DISCLOSURE

The present disclosure relates to an optical fiber adapter, especially relates to an optical fiber adapter which can save the occupied space inside a cabinet.

BACKGROUND OF THE PRESENT DISCLOSURE

Chinese patent application CN 201110196128.6 discloses an optical fiber adapter, which comprises a main body, an inner shell body, a cover plate and an elastic light sheltering piece. The main body has an axial chamber, the chamber is defined by a first wall, a second wall, a third wall and a fourth wall, the first wall and the third wall face each other and connect with the second wall and the fourth wall. Two axial ends of the axial chamber of the main body respectively have openings, the first wall is provided with a receiving opening. The inner shell body is arranged in the axial chamber of the main body, the inner shell body comprises a flange and a hollow cylindrical body, the cylindrical body extends out of a front surface of the flange. The cover plate covers on the receiving opening on the first wall. The light sheltering piece is arranged in the chamber of the main body, the light sheltering piece comprises: a horizontal portion which is arranged on the third wall; a light sheltering portion which extends to the front of an opening of the hollow cylindrical body; a connecting portion which is connected with the horizontal portion and the light sheltering portion; and a hooking portion which extends out of the horizontal portion and is hooked on the flange. The existing optical fiber adapter achieves transmission of optical signals by inserting a LC-type optical fiber connector on each of the front and rear sides, and the overall size of the optical fiber adapter in the front-rear direction is longer, especially the LC-type optical fiber connector which is inserted at the rear portion of the optical fiber adapter needs to occupy a larger space for coiling the optical fiber up inside the cabinet, which is not beneficial to the trend of the cabinet miniaturization. So, it is necessary to improve.

SUMMARY

A technical problem to be solved by the present disclosure is to provide an optical fiber adapter which can shorten the length of the rear portion thereof and save the occupied space inside a cabinet so as to overcome the deficiency in the prior art described above.

In view of the above technical problem, the present disclosure provides an optical fiber adapter, which is adapted to accommodate at least two optical fiber connectors inserted therein, the optical fiber adapter comprise:

a housing, a front portion of the housing is provided with at least two accommodating cavities which penetrate in a front-rear direction, are arranged sided by side, and are closed circumferentially, and a rear portion of the housing is provided with a mounting base;

at least two optical fiber plugs provided on the mounting base, each optical fiber plug comprises a positioning member, a ferrule fixed to the positioning member and extending forwardly, an optical fiber exposed to a front end of the ferrule, a sleeve fitted on an outer periphery of the ferrule and a positioning cylinder further sheathed on an outer periphery of the sleeve, a front end of the positioning cylinder extends forwardly into the accommodating cavity, a rear end of the positioning cylinder is fixed to the positioning member, an outer periphery of the positioning member is provided with a first flange; and at least a fixing cover locked on the mounting base of the housing, the fixing cover and the mounting base are assembled to form a first latching groove, the first latching groove correspondingly accommodates the first flange of the optical fiber plug and positions the first flange of the optical fiber plug.

In some embodiments, the outer periphery of the positioning member is further provided with a second flange; the fixing cover and the mounting base are assembled to further form a second latching groove, the first latching groove and the second latching groove are spaced from each other in the front-rear direction, the second latching groove correspondingly accommodates the second flange of the optical fiber plug and positions the second flange of the optical fiber plug.

In some embodiments, the mounting base is provided with a first lower half latching groove and a second lower half latching groove which are opened upwardly, a bottom portion of the fixing cover is provided with a first upper half latching groove and a second upper half latching groove which are opened downwardly, the first lower half latching groove and the first upper half latching groove are correspondingly assembled to form the first latching groove, the second lower half latching groove and the second upper half latching groove are correspondingly assembled to form the second latching groove.

In some embodiments, the first flange and the first latching groove cooperate and can positions the optical fiber plug in the front-rear direction; and the second flange and the second latching groove cooperate and can prevent the optical fiber plug from rotating.

In some embodiments, the first flange is a circular flange, can abut against a rear surface of the first latching groove; the second flange is a square flange, a circumferential profile of the second flange can be just matched with an inner profile of the second latching groove.

In some embodiments, the positioning member is a generally hollow cylinder, a front surface of the positioning member is recessed with a mounting groove, a rear end of the positioning cylinder is fixed in the mounting groove, a front end of the sleeve protrudes forwardly relative to the front end of the ferrule, the front end of the positioning cylinder protrudes forwardly relative to the front end of the sleeve, an inner wall front end of the positioning cylinder narrows inwardly to prevent the sleeve from coming out forwardly.

In some embodiments, a middle portion of the positioning member is formed with a channel which allows the ferrule to pass through therein from rear to front, a rear surface of the positioning member is recessed with a mounting groove; the optical fiber plug further comprises a rear cover abutting against a rear end of the ferrule, a front end of the rear cover is fixed in the mounting groove.

In some embodiments, the optical fiber plug further comprises a flexible pipe covering an outer periphery of the optical fiber, a rear surface of the rear cover is formed with a fixing groove, a front end of the flexible pipe is fixed in the fixing groove.

In some embodiments, the housing and the fixing cover are all made of a zinc alloy by die-casting, an outer periphery of the housing is provided with a recessed groove, the recessed groove is provided with an electrical conductive adhesive bar therein.

In some embodiments, a middle portion of the fixing cover is provided with a fixing hole penetrating in the up-down direction, the fixing cover can be locked to the housing by the fixing member passing through the fixing hole.

In some embodiments, two sides of the housing each are with a locking protrusion protruding outwardly, the locking protrusion is provided with a locking hole penetrating in the up-down direction.

In some embodiments, the housing is provided with multiple pairs of accommodating cavities arranged sided by side; the fixing cover is provided as multiple, each fixing cover is used to fix one pair of optical fiber plugs.

In some embodiments, one side of the housing is provided with a concave portion, and the side of the housing is correspondingly provided with a convex portion matching with the concave portion.

In some embodiments, a bottom portion of the housing is provided with at least a fixing aperture.

Compared with the prior art, the present disclosure can lock at least two compact optical fiber plugs between the housing and the fixing cover by providing the housing, the optical fiber plugs and the fixing cover which cooperate with each other skillfully, the signal can be transmitted directly through the optical fiber connected to the rear part of the optical fiber plug, it is not necessary to insert a longer and larger LC-type optical fiber connector to the rear side of the optical fiber adapter correspondingly, thereby shortening the size of the rear portion and saving the occupied space inside the cabinet.

DETAILED DESCRIPTION

Figure 1:
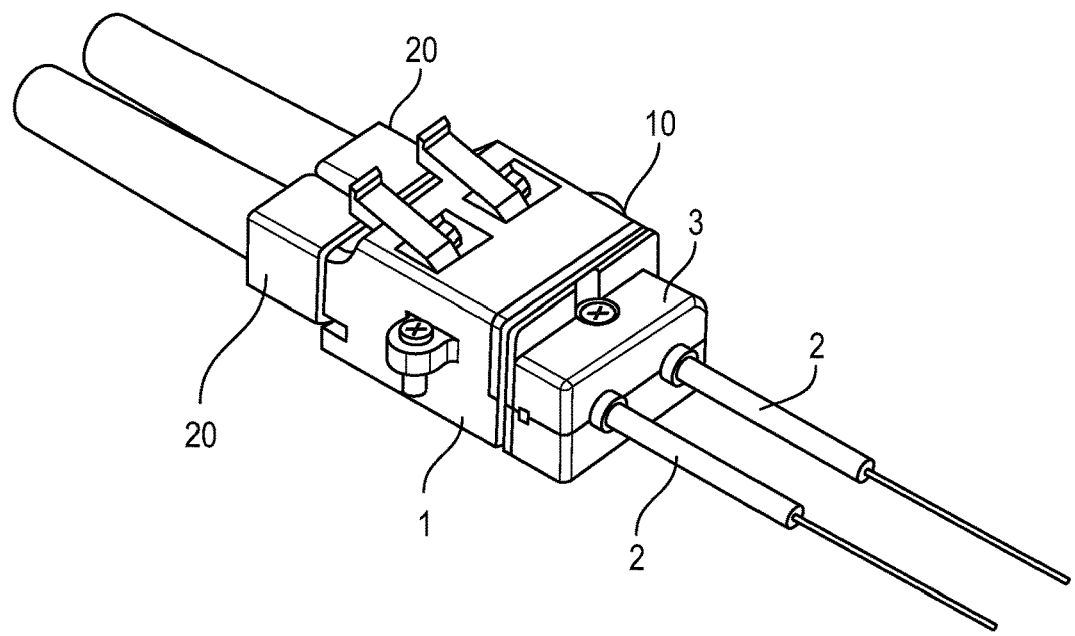
FIG. 1 is an assembled perspective view of a preferred embodiment of an optical fiber adapter in the present disclosure and two optical fiber connectors.
Figure 2:
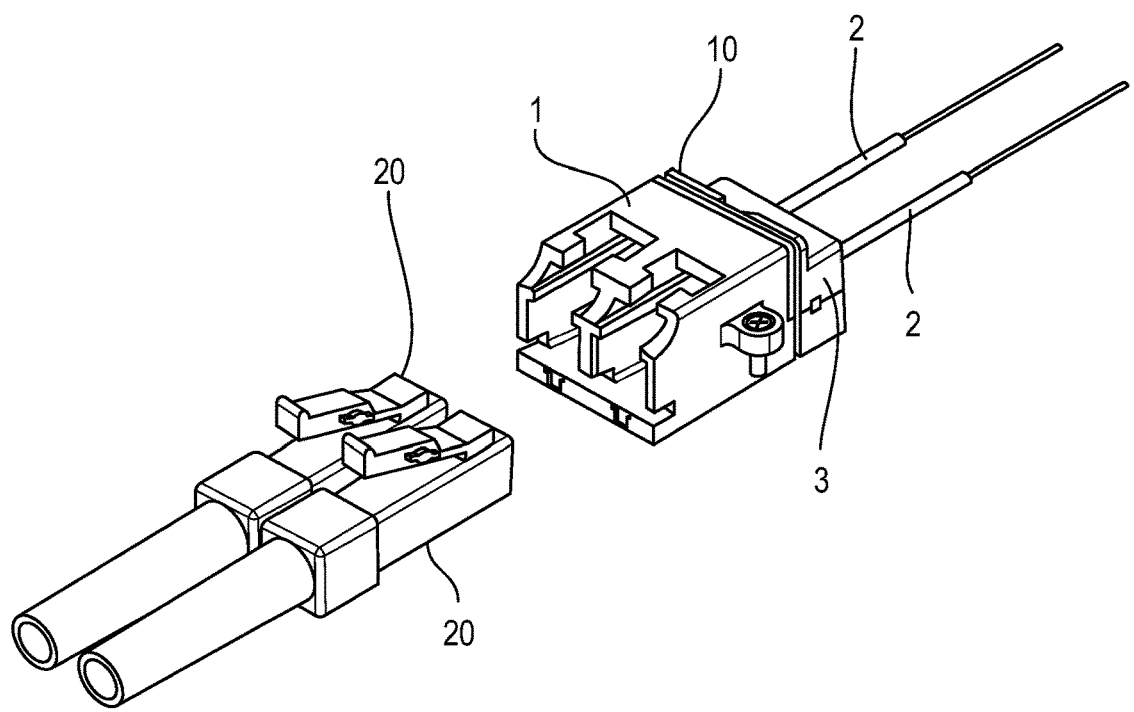
FIG. 2 is an exploded perspective view of the preferred embodiment of the optical fiber adapter in the present disclosure and the two optical fiber connectors.
Figure 3:
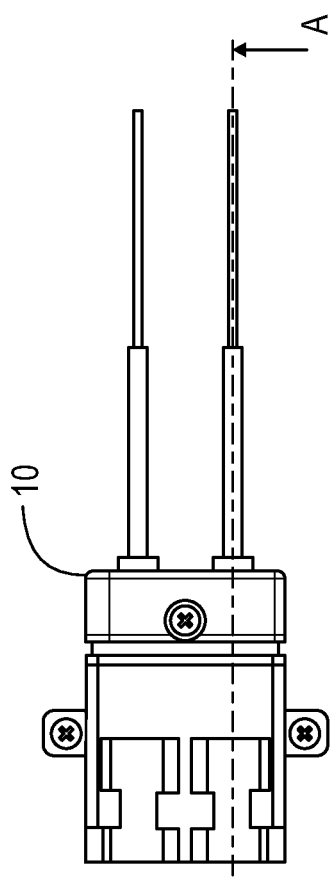
FIG. 3 is a top view of the preferred embodiment of the optical fiber adapter in the present disclosure and the two optical fiber connectors.
Figure 3:
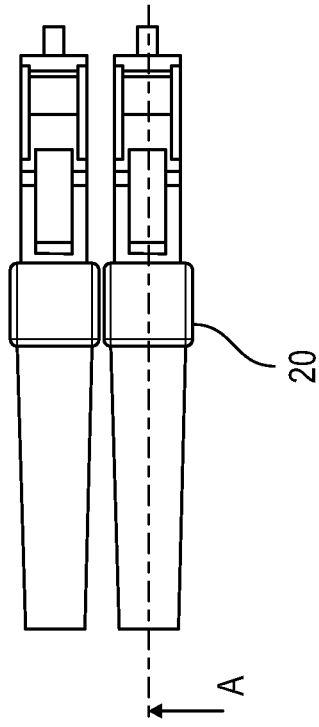
Figure 4:
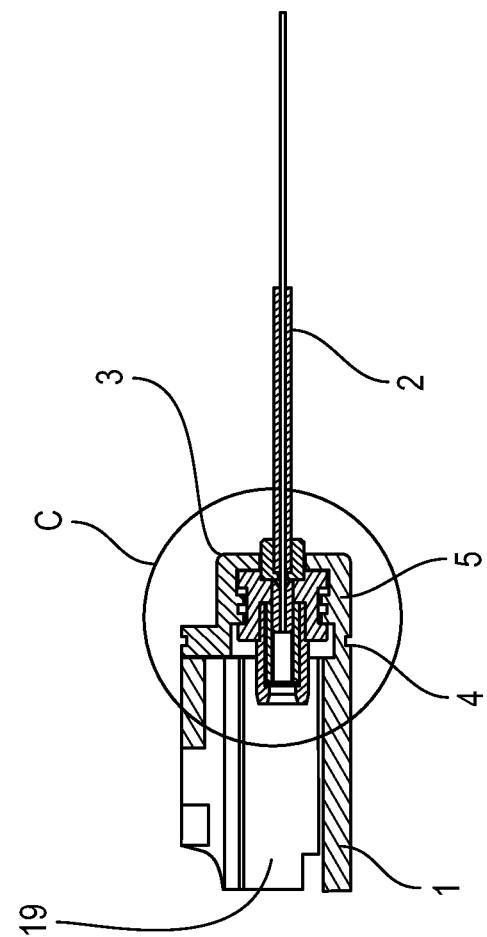
FIG. 4 is a cross-sectional view taken along a line A-A in FIG. 3.
Figure 4:
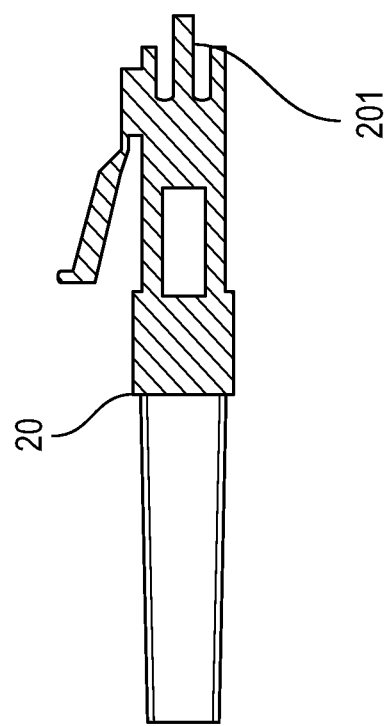

While the present disclosure may be susceptible to embodiments in different forms, there are shown in the figures, and will be described herein in detail, are only specific embodiments, with the understanding that the present disclosure is to be considered as an exemplification of the principles of the present disclosure, and is not intended to limit the present disclosure to that as illustrated.

As such, references to a feature are intended to describe a feature of an example of the present disclosure, not to imply that every embodiment thereof must have the described feature. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the figures, representations of directions such as up, down, left, right, front and rear, used for explaining the structure and movement of the various parts of the present disclosure, are not absolute, but relative. These representations are appropriate when the parts are in the position shown in the Figures. If the description of the position of the parts changes, these representations are to be changed accordingly.

Hereinafter embodiments of the present discourse will be further described in detail in combination with the figures.

Referring to a preferred embodiment of an optical fiber adapter in the present disclosure as shown in FIG. 1 to FIG. 14, the optical fiber adapter 10 substantially comprises: a housing 1, two optical fiber plugs 2, a fixing cover 3 and a fastener 6. The fixing cover 3 can lock the two optical fiber plugs 2 to the housing 1 by means of the fastener 6. The optical fiber adapter 10 can accommodate two optical fiber connectors 20 to be inserted therein simultaneously, in the preferred embodiment, the optical fiber connector 20 is a LC-type optical fiber connector, a ferrule 201 thereof can be inserted into a corresponding mating cavity 29, thereby the two optical fiber plugs 2 is mated with the two optical fiber connectors 20 with optical transmission.

Figure 5:
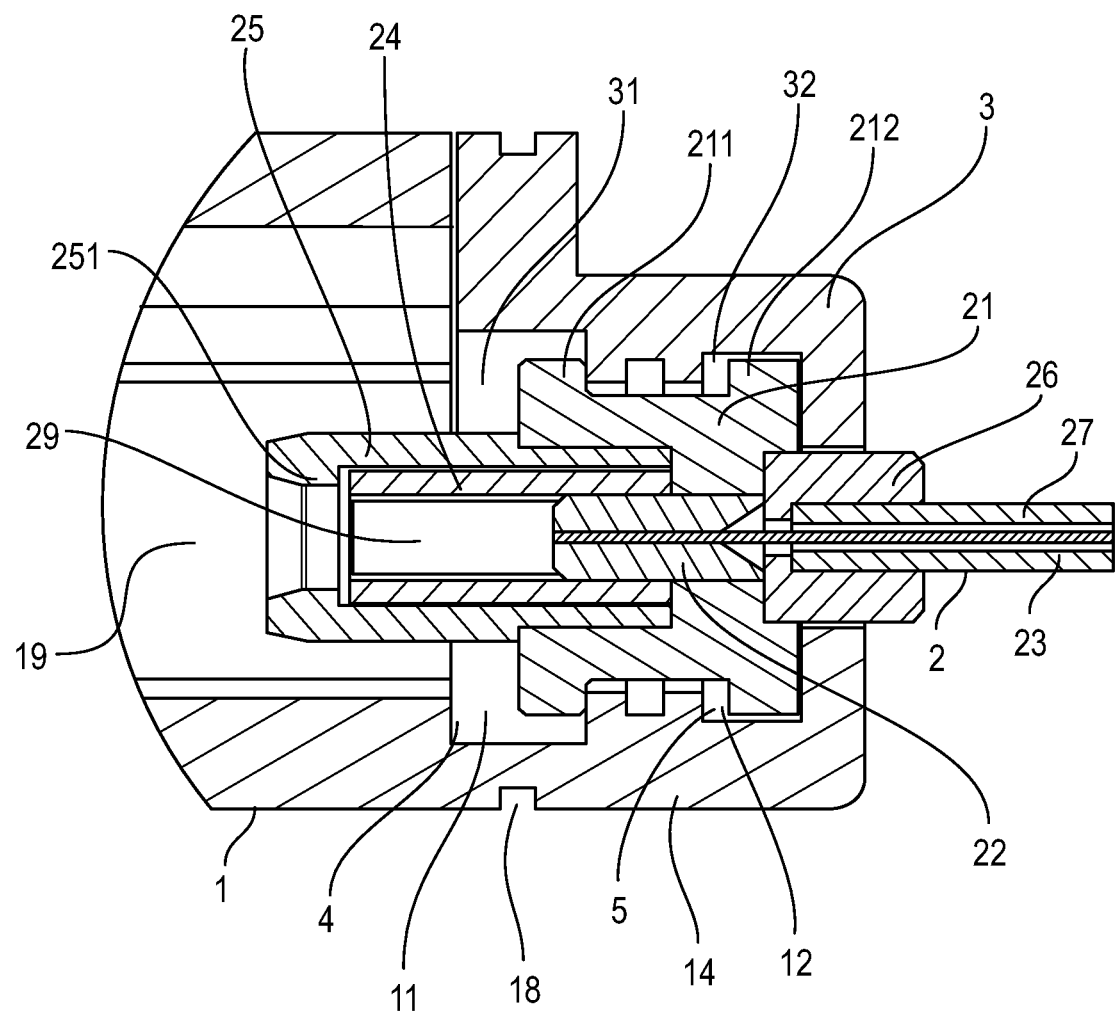
FIG. 5 is a partial enlarged view of a region C in FIG. 4.
Figure 6:
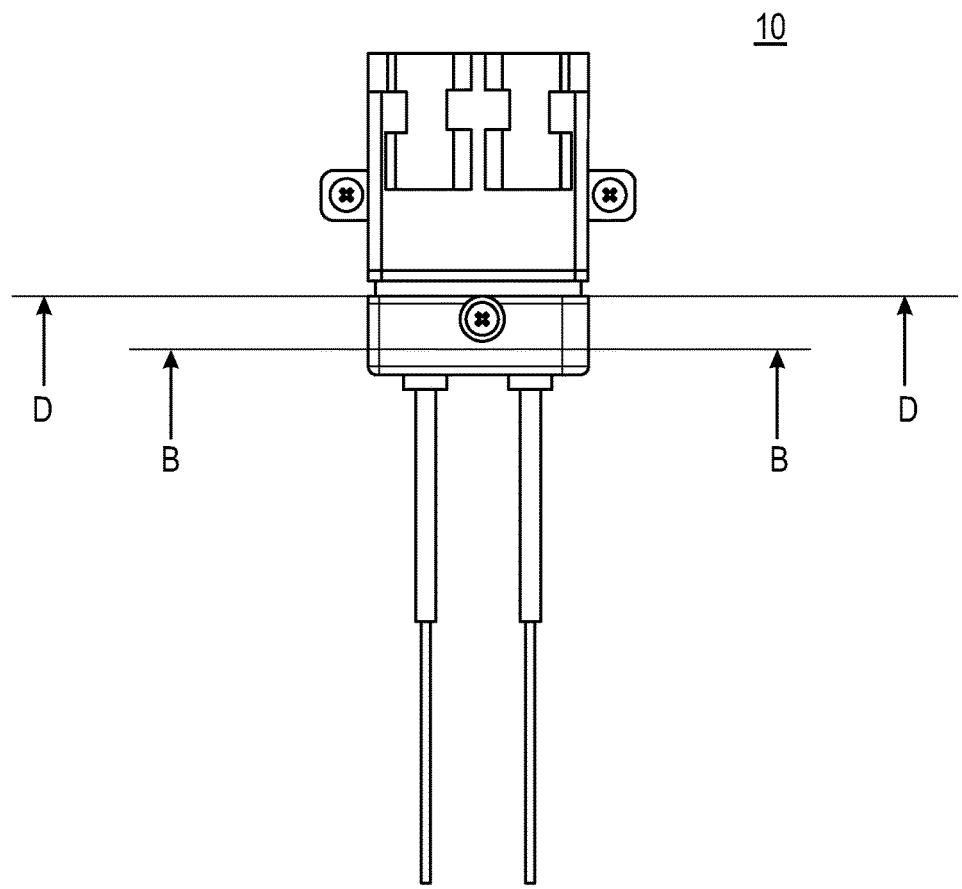
FIG. 6 is a top view of the preferred embodiment of the optical fiber adapter in the present disclosure.
Figure 7:
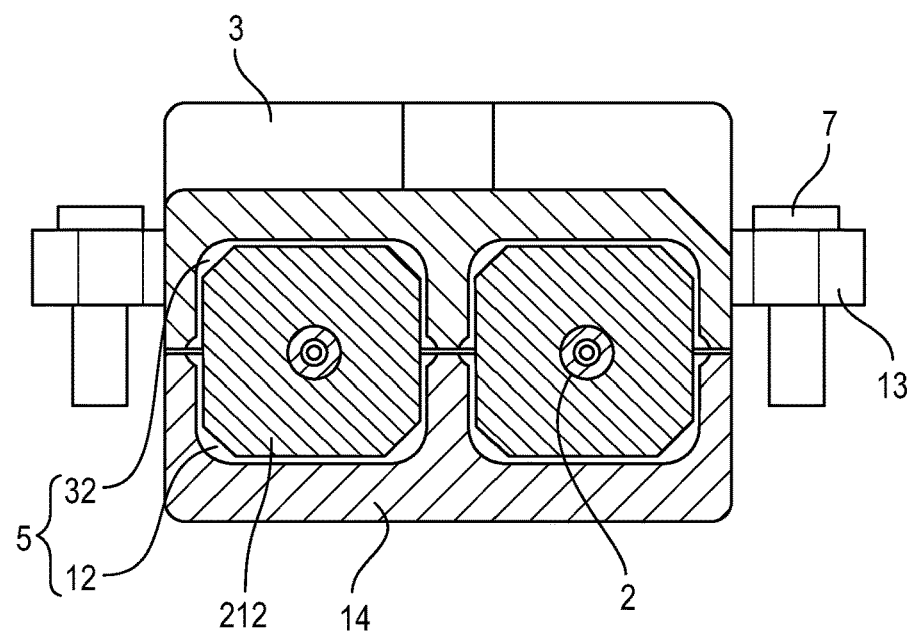
FIG. 7 is a cross-sectional view taken along a line B-B in FIG. 6.
Figure 8:
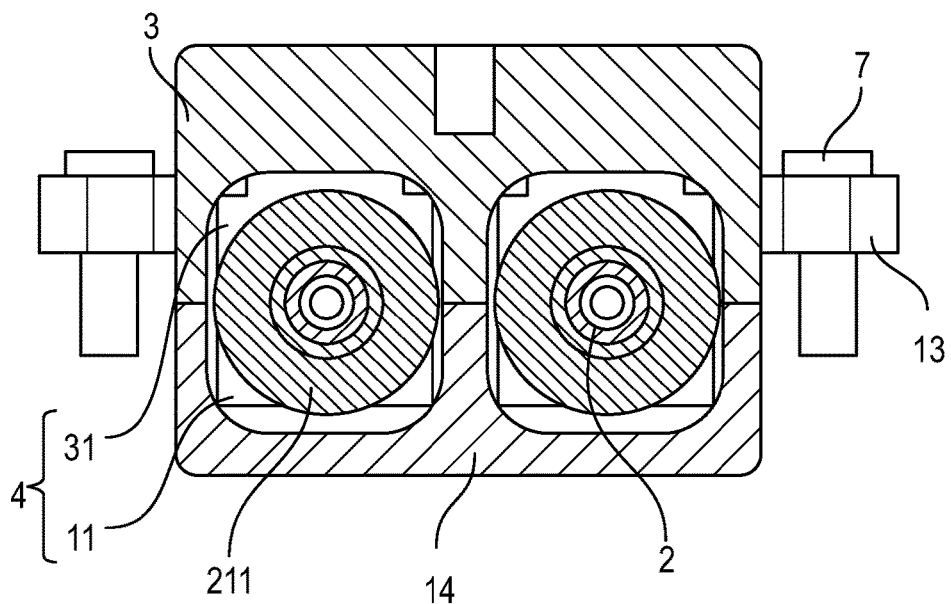
FIG. 8 is a cross-sectional view taken along a line D-D in FIG. 6.
Figure 9:
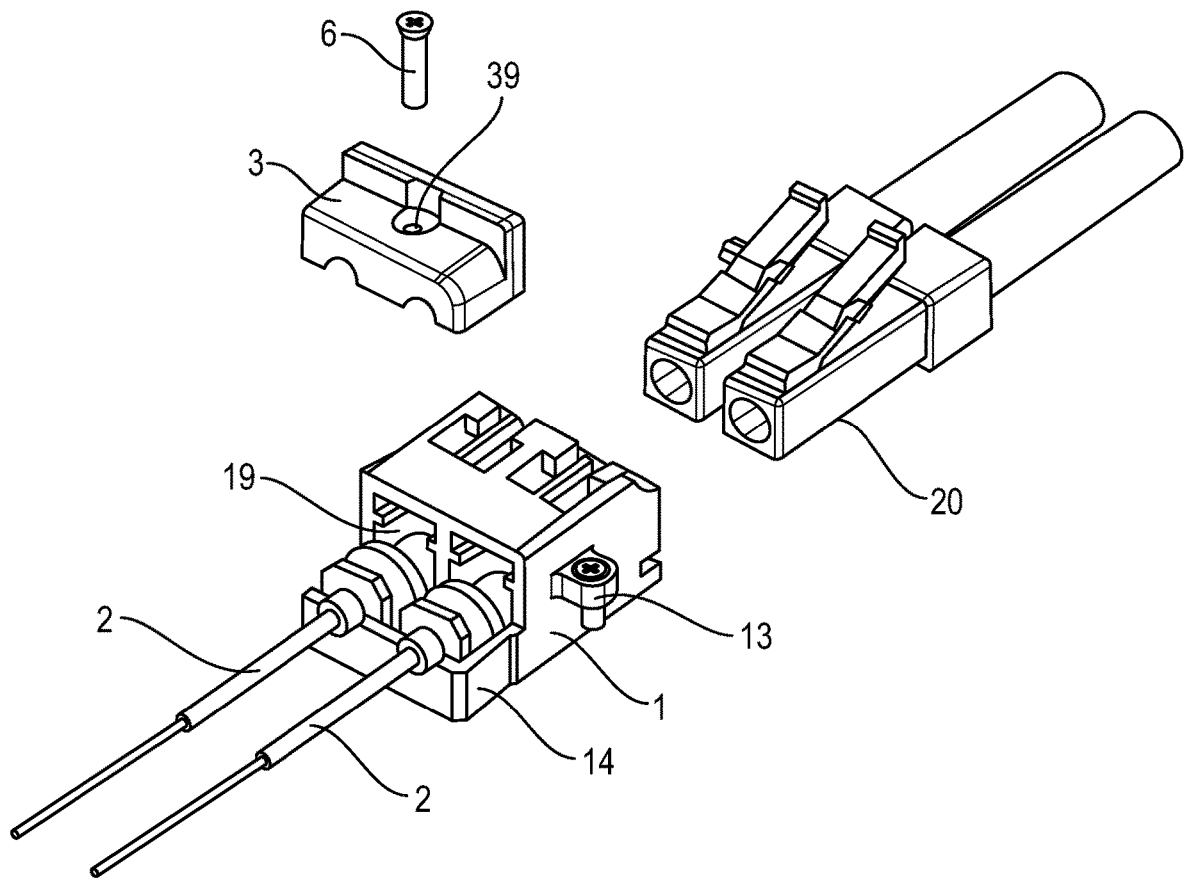
FIG. 9 is an exploded perspective view of the preferred embodiment of the optical fiber adapter in the present disclosure and the two optical fiber connectors.
Figure 10:
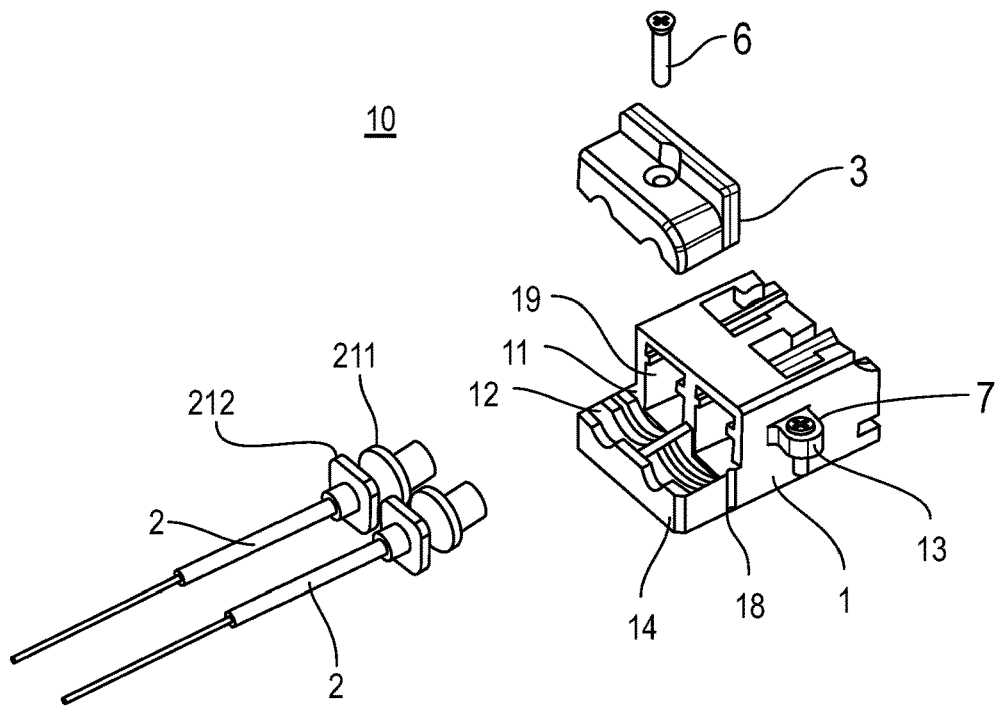
FIG. 10 is an exploded perspective view of the preferred embodiment of the optical fiber adapter in the present disclosure.
Figure 11:
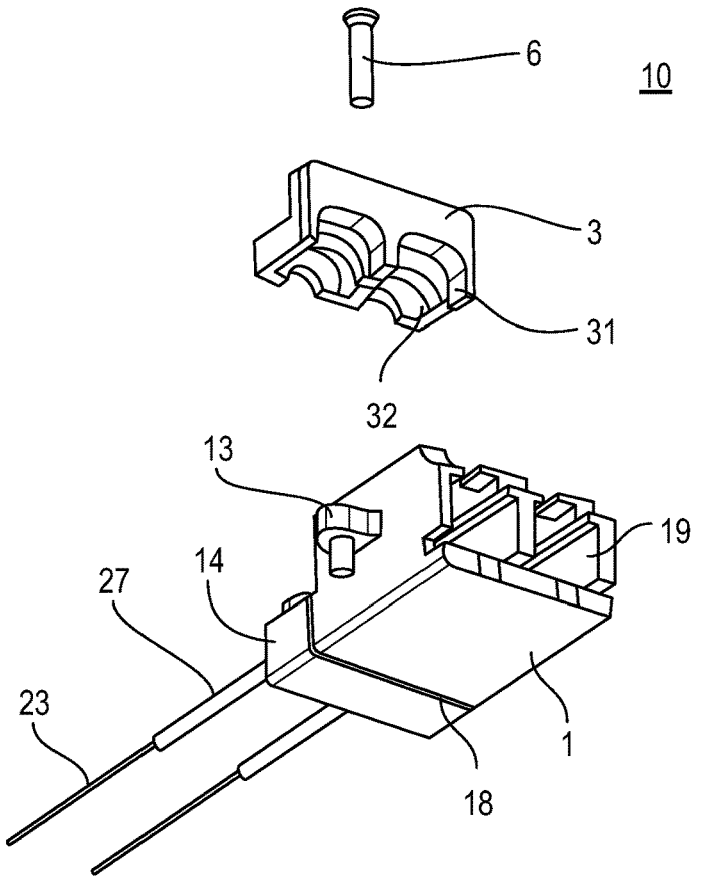
FIG. 11 is an exploded perspective view of the preferred embodiment of the optical fiber adapter in the present disclosure from another angle.
Figure 12:
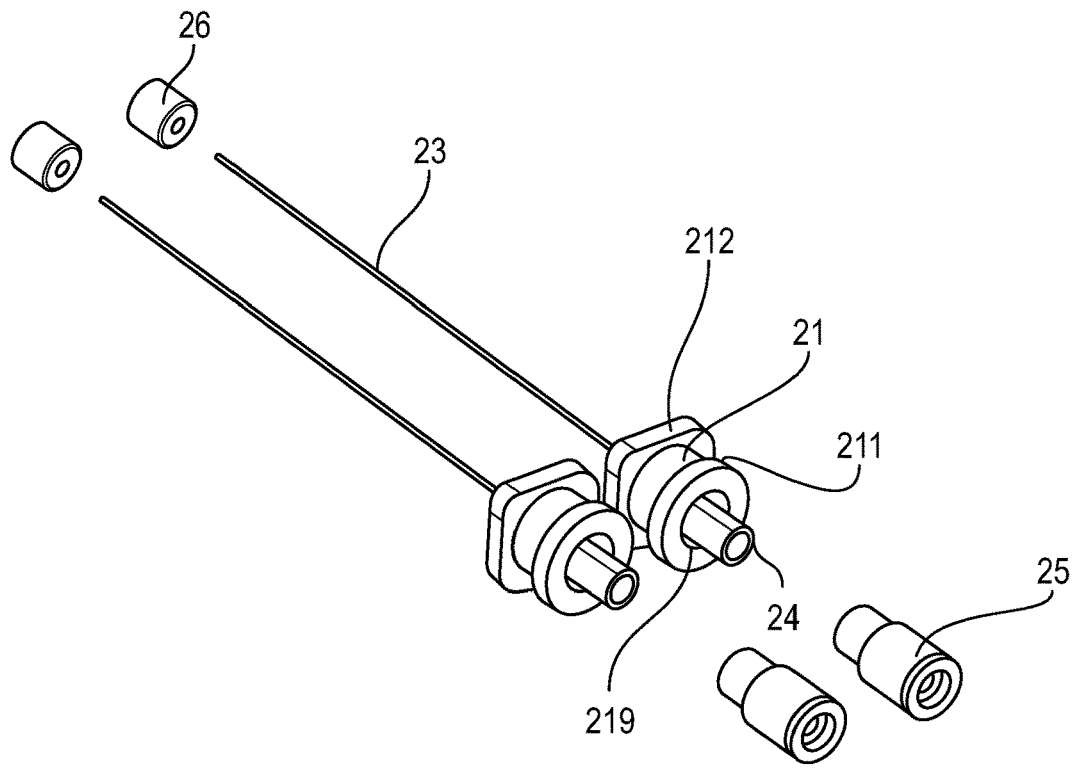
FIG. 12 is an exploded perspective view of an optical fiber plug of the preferred embodiment of the optical fiber adapter in the present disclosure.
Figure 13:
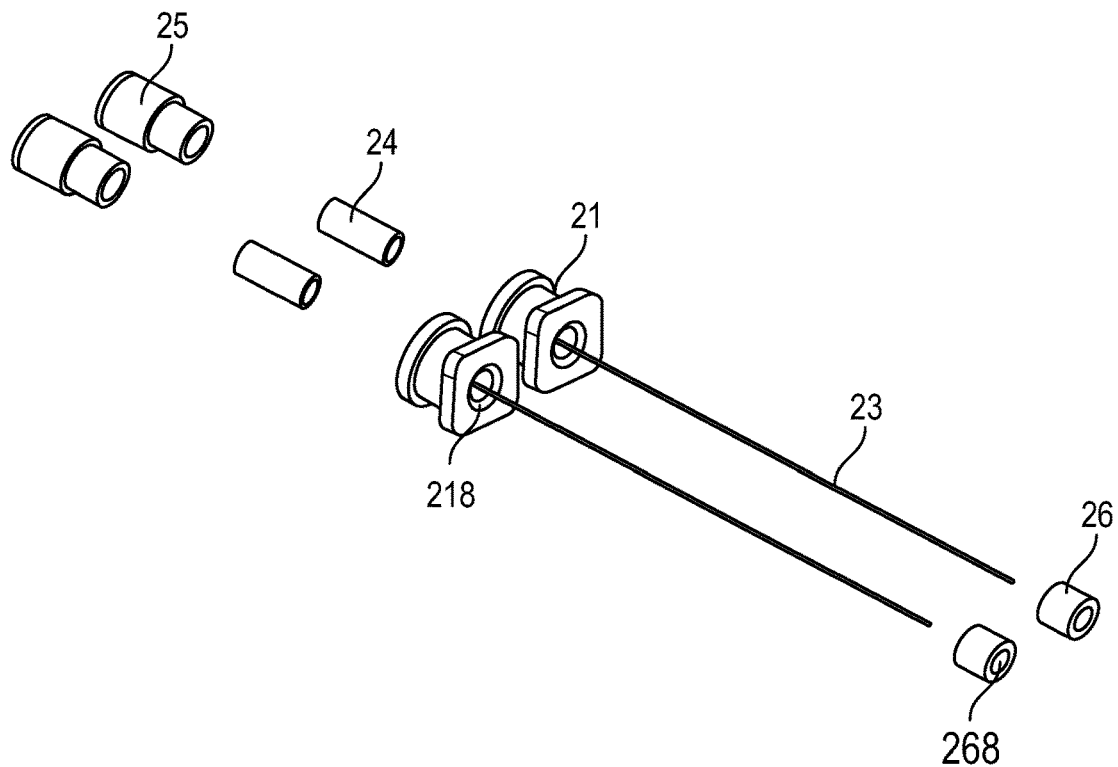
FIG. 13 is a further exploded perspective view of the optical fiber plug in the present disclosure on the basis of FIG. 12.
Figure 14:
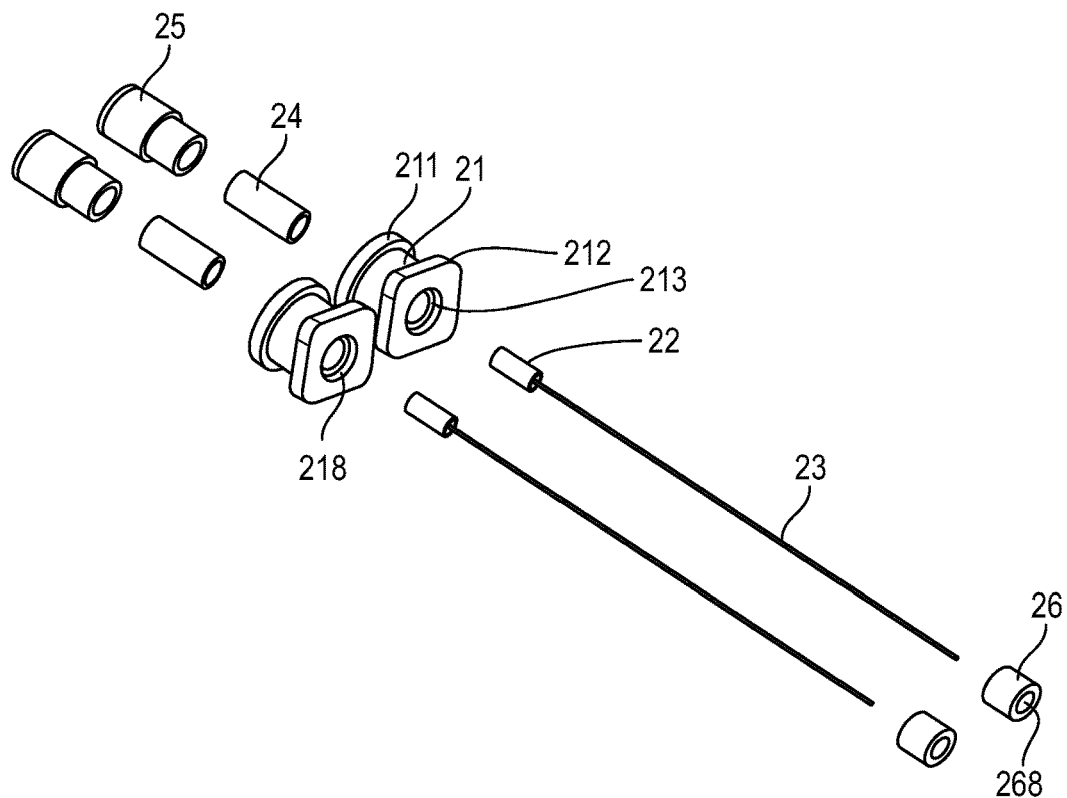
FIG. 14 is a further exploded perspective view of the optical fiber plug in the present disclosure on the basis of FIG. 13.

Referring to FIG. 5, FIG. 10 and FIG. 11, the housing 1 is made of a zinc alloy by die-casting. A front portion of the housing 1 is provided with two accommodating cavities 19 which penetrate in a front-rear direction and are arranged sided by side. A rear portion of the housing 1 is provided with a mounting base 14. Each accommodating cavity 19 is closed circumferentially, and can accommodate an optical fiber connector 20 correspondingly. The mounting base 14 is provided with a first lower half latching groove 11 and a second lower half latching groove 12 which are opened upwardly. The first lower half latching groove 11 is positioned close to the front, while the second lower half latching groove 12 is positioned behind the first lower half latching groove 11. Two sides of the housing 1 each are provided with a locking protrusion 13 protruding outwardly, the locking protrusion 13 is provided with a locking hole penetrating in an up-down direction, so that the housing 1 can be locked to a carrier board (not shown in figures) by means of a locking member 7 passing through the locking hole, for example, the carrier plate board may be a circuit board. An outer periphery of the housing 1 is provided with a recessed groove 18, the recessed groove 18 is provided with an electrical conductive adhesive bar (not shown in figures) therein. This structure enables the housing 1 to be closely fitted to and well electrically connected to an opening of a faceplate of a cabinet (not shown in figures), thereby improving the EMC (electromagnetic compatibility) performance of the optical fiber adapter 10.

Referring to FIG. 5 to FIG. 8 and FIG. 11 to FIG. 14, the optical fiber plug 2 is an assembled piece, provided on the mounting base 14, and comprises: a positioning member 21, a ferrule 22 inserted in and fixed to the positioning member 21 from rear to front, an optical fiber 23 exposed to a front end of the ferrule 22, a sleeve 24 tight fitted on an outer periphery of the ferrule 22, a positioning cylinder 25 sheathed on an outer periphery of the sleeve 24 with clearance fit, a rear cover 26 abutting against a rear end of the ferrule 22 and a flexible pipe 27 covering an outer periphery of the optical fiber 23. The previously-mentioned mating cavity 29 is enclosed by the sleeve 24 and the ferrule 22. A front end of the positioning cylinder 25 extends forwardly into the accommodating cavity 19. When the optical fiber plug 2 is locked onto the housing 1, the mating cavity 29 is communicated with the accommodating cavity 19, the ferrule 201 of the optical fiber connector 20 can be inserted into the mating cavity 29 of the corresponding optical fiber plug 2 so as to be accurately aligned with the optical fiber 23 on the ferrule 22.

The positioning member 21 is a generally hollow cylinder. A middle portion of the positioning member 21 is formed with a channel 213 which may just allow the ferrule 22 to pass through therein from rear to front. A front end and a rear end of the positioning member 21 are respectively with a first flange 211 and a second flange 212 which protrude. A front surface of the positioning member 21 is recessed with a mounting groove 219, a rear end of the positioning cylinder 25 is fixed in the mounting groove 219. A rear surface of the positioning member 21 is recessed with a mounting groove 218, a front end of the rear cover 26 is fixed in the mounting groove 218. In the embodiment, the first flange 211 is a circular flange. The second flange 212 is a square flange. Preferably, four corners of the second flange 212 each are provided with a round corner. In the embodiment, the ferrule 22 and the sleeve 24 are all ceramic materials. A front end of the sleeve 24 protrudes forwardly relative to the front end of the ferrule 22 to form the mating cavity 29, the front end of the positioning cylinder 25 also protrudes forwardly relative to the front end of the sleeve 24, an inner wall front end 251 of the positioning cylinder 25 narrows inwardly to prevent the sleeve 24 from coming out forwardly. A rear surface of the rear cover 26 is formed with a fixing groove 268, a front end of the flexible pipe 27 is fixed in the fixing groove 268. A front portion of the optical fiber 23 is inserted into the ferrule 22, a front end of the optical fiber 23 is flush with the front end of the ferrule 22. The ferrule 22 is inserted tightly into the positioning member 21. The rear cover 26 restricts the ferrule 22 to come out backwardly. The flexible pipe 27 can protect a portion of the optical fiber 23 which extends backwardly out of the rear cover 26, prevent the slender optical fiber 23 from being broken off.

Referring to FIG. 5 to FIG. 11, the fixing cover 3 is made of a zinc alloy by die-casting. A middle portion of the fixing cover 3 is provided with a fixing hole 39 penetrating in the up-down direction, the fixing cover 3 is locked to the housing 1 by the fixing member 6 passing through the fixing hole 39. A bottom portion of the fixing cover 3 is provided with a first upper half latching groove 31 and a second upper half latching groove 32 which are opened downwardly. The first upper half latching groove 31 and the first lower half latching groove 11 of the housing 1 are correspondingly assembled to form a first latching groove 4, the second upper half latching groove 32 and the second lower half latching groove 12 of the housing 1 are correspondingly assembled to form a second latching groove 5. The first latching groove 4 and the second latching groove 5 respectively accommodate the first flange 211 and the second flange 212 of the optical fiber plug 2 and position the first flange 211 and the second flange 212 of the optical fiber plug 2. The first flange 211 and the first latching groove 4 cooperate and can position the optical fiber plug 2 in the front-rear direction; and the second flange 212 and the second latching groove 5 cooperate and can prevent the optical fiber plug 2 from rotating. In the embodiment, the first flange 211 can abut against a rear surface of the first latching groove 4 to prevent the first latching groove 4 from further moving backwardly. A circumferential profile of the second flange 212 can be just matched with an inner profile of the second latching groove 5, thereby preventing the rotating of the optical fiber plug 2.

An assembling process of the optical fiber adapter 10 in the present disclosure substantially comprises: firstly manufacturing the housing 1, the fixing cover 3 and the optical fiber plugs 2; then respectively mounting two optical fiber plugs 2 on the mounting base 14 of the housing 1, making the first flange 211 and the second flange 212 respectively enter into the first lower half latching groove 11 and the second lower half latching groove 12; and then covering the fixing cover 3 onto the top of the housing 1, making the first flange 211 and the second flange 212 respectively enter into the first upper half latching groove 31 and the second upper half latching groove 32; finally locking the fixing cover 3 to the housing 1 by the fastener 6 such as a screw.

Compared with the prior art, the present disclosure can lock the two compact optical fiber plugs 2 between the housing 1 and the fixing cover 3 by providing the housing 1, the optical fiber plugs 2 and the fixing cover 3 which cooperate with each other skillfully, the signal can be transmitted directly through the optical fiber 23 connected to the rear part of the optical fiber plug 2, it is not necessary to insert a longer and larger LC-type optical fiber connector to the rear side of the optical fiber adapter 10 correspondingly, thereby shortening the size of the rear portion and saving the occupied space inside the cabinet.

Figure 15:
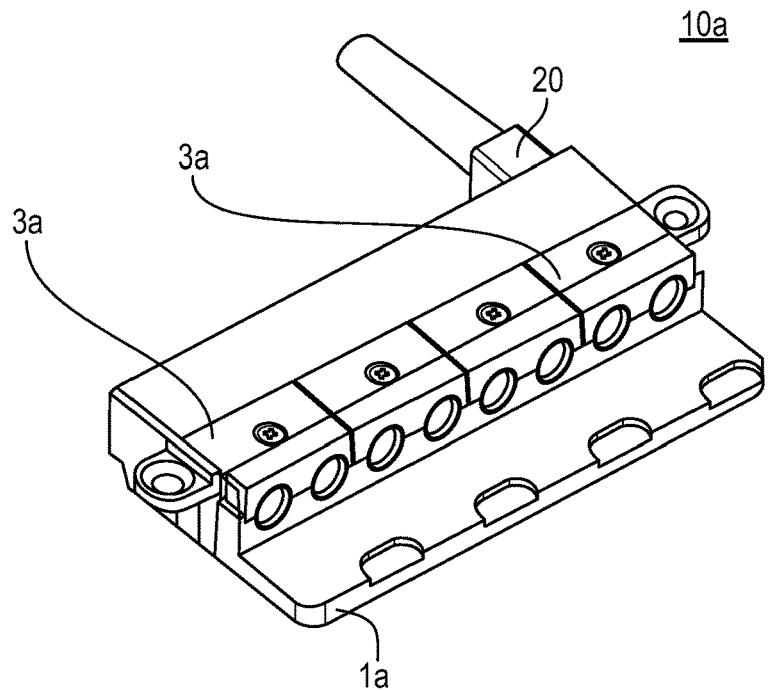
FIG. 15 is a perspective view of a second preferred embodiment of the optical fiber adapter in the present disclosure.

Referring to a second preferred embodiment of the optical fiber adapter in the present disclosure as shown in FIG. 15, the difference between the optical fiber adapter 10a and the previously-mentioned optical fiber adapter 10 lies in that: the housing 1a of the optical fiber adapter 10a is formed with four pairs of accommodating cavities, the optical fiber adapter 10a can mate with eight optical fiber connectors 20; moreover, the optical fiber adapter 10a has four fixing covers 3a. Each fixing cover 3a is the same as the previously-mentioned fixing cover 3, and respectively used to fix a pair of optical fiber plugs 20. With this design using a plurality of fixing covers 3a, the molding cost of the optical fiber adapter 10a can be reduced when the number of the accommodating cavities changes.

Figure 16:
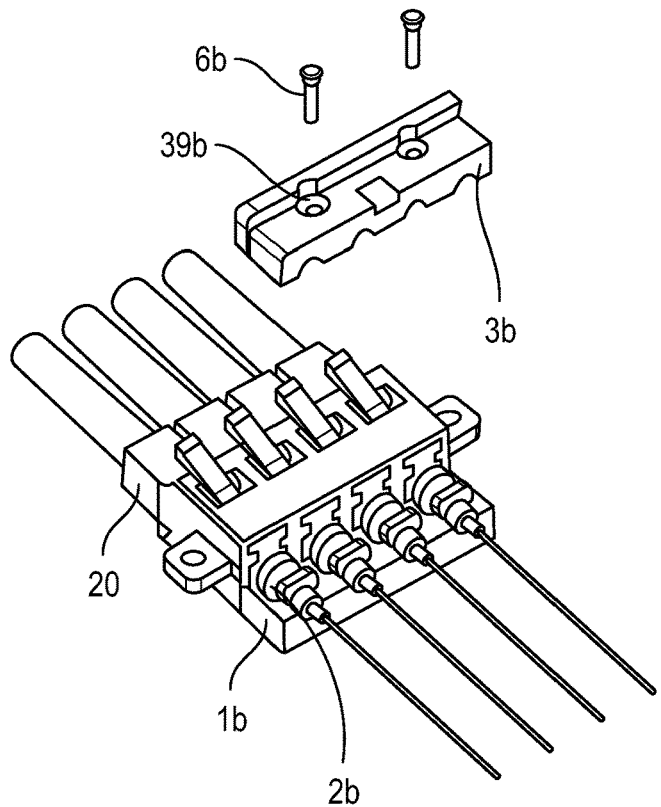
FIG. 16 is an exploded perspective view of a third preferred embodiment of the optical fiber adapter in the present disclosure.

Referring to a third preferred embodiment of the optical fiber adapter in the present disclosure as shown in FIG. 16, the difference between the optical fiber adapter 10b and the previously-mentioned optical fiber adapter 10 lies in that: the housing 1b of the optical fiber adapter 10b is formed with two pairs of accommodating cavities, and provided with four optical fiber plugs 2b, the optical fiber adapter 10b can mate with four optical fiber connectors 20; moreover, the optical fiber adapter 10b has one fixing cover 3b, the difference between the fixing cover 3a and the previously-mentioned fixing cover 3 lies in that: four first latching grooves and four second latching grooves are provided at the low portion of the fixing cover 3a, and the fixing cover 3a can cooperate with the housing 1b through the two fixing holes 39b and the two fasteners 6b passing through the two fixing holes 39b.

Figure 17:
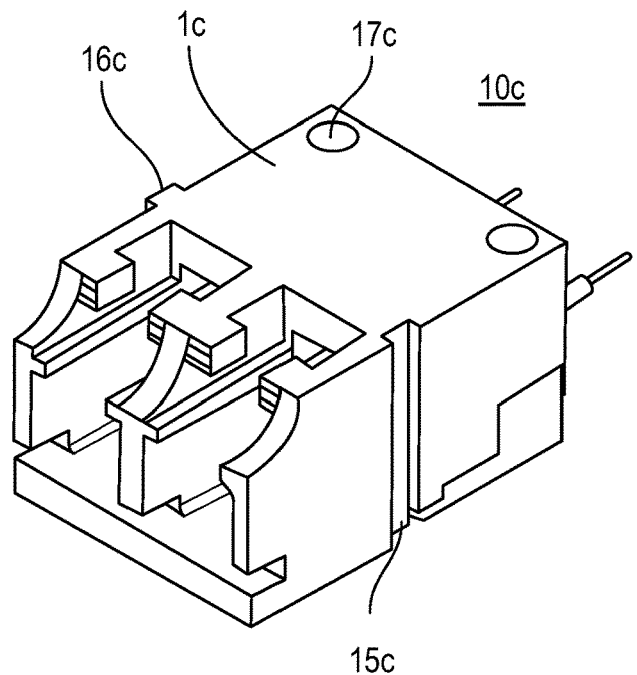
FIG. 17 is a perspective view of a fourth preferred embodiment of the optical fiber adapter in the present disclosure.
Figure 18:
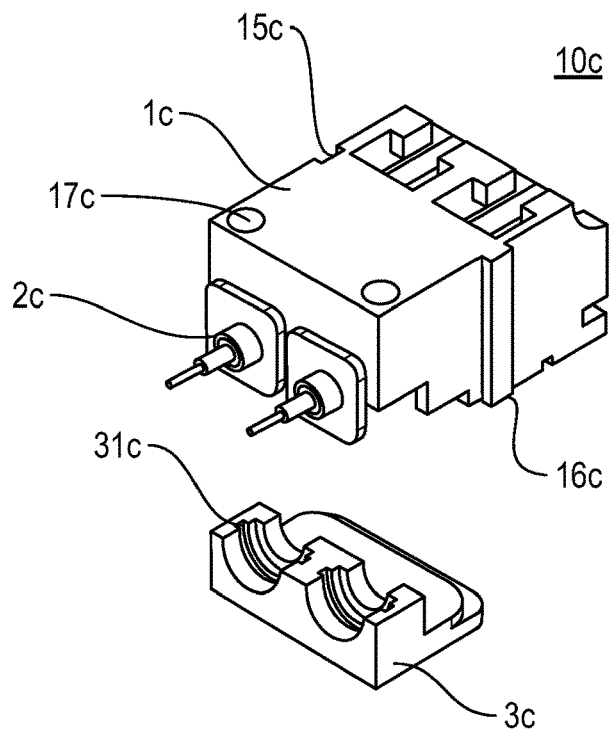
FIG. 18 is an exploded perspective view of the fourth preferred embodiment of the optical fiber adapter in the present disclosure.
Figure 19:
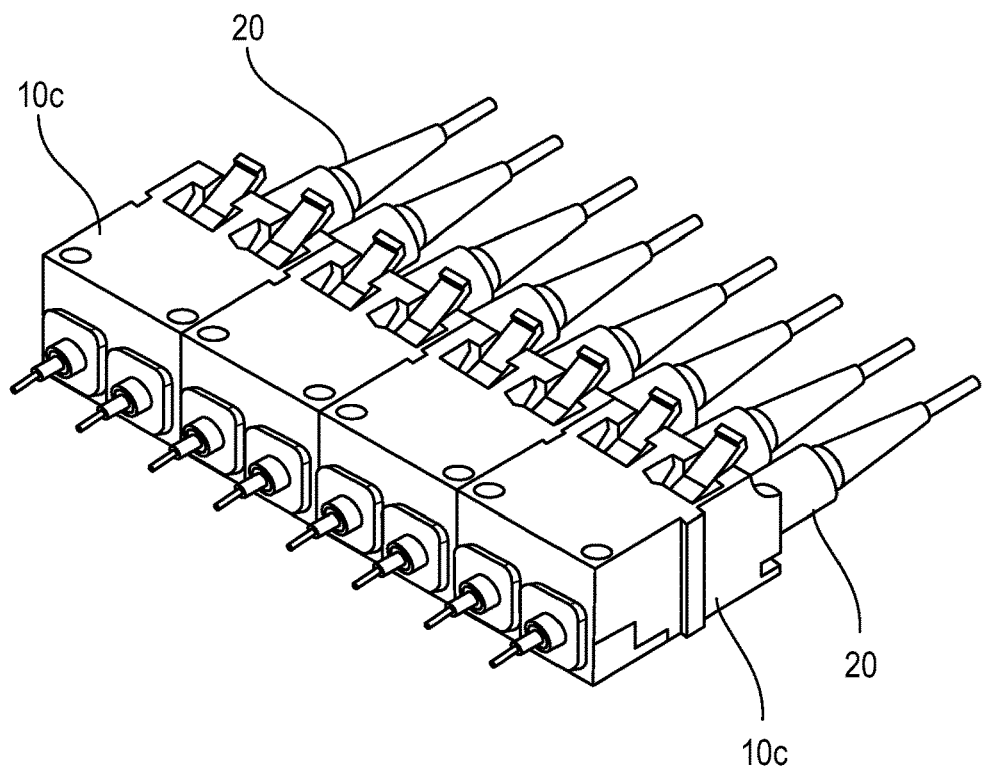
FIG. 19 is a perspective view of the fourth preferred embodiment of the optical fiber adapter in the present disclosure to show a case that the optical fiber adapters are assembled in use.

FIG. 17, FIG. 18 and FIG. 19 show a fourth preferred embodiment of the optical fiber adapter in the present disclosure, the difference between the optical fiber adapter 10c and the previously-mentioned optical fiber adapter 10 lies in that: the bottom portion of the housing 1c is provided with two fixing apertures 17c, the two fixing apertures 17c replace the locking holes of the two locking protrusions 13 of the previously-mentioned housing 1, the housing 1c can be locked to a carrier board (not shown in figures) by means of the two fixing apertures 17c; moreover, one side of the housing 1c is provided with a concave portion 15c, and the other side of the housing 1c is provided with a convex portion 16c correspondingly matching with the concave portion 15c, so that cooperative alignment of the plurality of housings 1c can be realized. Moreover, the fixing cover 3c is only formed with a first upper half latching groove 31c which cooperates with the housing 1c to form the first latching groove and cooperates with the first flange (not shown in figures) of the optical fiber plug 2c, such an optical fiber adapter 10c in which only the first latching groove is provided facilitates further shortening of its overall length relative to the optical fiber adapter 10 of the first embodiment in the present disclosure. FIG. 19 shows the case of cooperative alignment of four optical fiber adapters 10c, and such an assembled optical fiber adapter can mate with eight optical fiber connectors 20 simultaneously. The optical fiber adapter 10c employs a unitary-type design, so that a corresponding number of optical fiber adapters 10c can be used depending on the number of fiber optic interfaces in a system, which is very flexible in use and may reduce cost.

The above contents are only embodiments of the present disclosure and are not used to limit the implementing solution of the present disclosure, those skilled in the art may conveniently make corresponding variation or modification based on the main concept and spirit of the present disclosure, therefore the extent of protection of the present disclosure shall be determined by terms of the Claims.

What is claimed is:

1. An optical fiber adapter, adapted to accommodate at least two optical fiber connectors plugged therein, characterized by comprising:
   a base, having, at a front portion thereof, at least two accommodating cavities that are disposed in parallel and circumferentially enclosed and extend therethrough in the front-and-rear direction, and having a mounting seat at a rear portion thereof;
   at least two optical fiber plugs provided on the mounting seat, each optical fiber plug comprising a position fixing member, a ferrule fixed on the position fixing member and extending forward therefrom, an optical fiber exposed at a front end of the ferrule, a sleeve fittingly sleeved at an outer periphery of the ferrule, and a position fixing cylinder further sleeved at an outer periphery of the sleeve, a front end of the position fixing cylinder extending forward into the accommodating cavity, a rear end of the position fixing cylinder being fixed to the position fixing member, and a circular first flange being provided at an outer periphery of the position fixing member; and
   at least one fixing cap locked above the mounting seat of the base, wherein the fixing cap and the mounting seat are combined to form first latching grooves, and the first latching grooves correspondingly accommodate the first flanges of the optical fiber plugs.

2. The optical fiber adapter according to claim 1, wherein a second flange is further provided at an outer periphery of the position fixing member; the fixing cap and the mounting seat are combined to further form second engagement grooves, the first latching grooves and the second engagement grooves are spaced in the front-and-rear direction, and the second engagement grooves correspondingly accommodate the second flanges of the optical fiber plugs.

3. The optical fiber adapter according to claim 2, wherein the mounting base is provided with first lower half engagement slots and second lower half engagement slots that open upward, and the bottom of the fixing cap is provided with first upper half engagement slots and second upper half engagement slots that open downward; wherein the first lower half engagement slots and the first upper half engagement slots are correspondingly combined to form the first latching grooves, and the second lower half engagement slots and the second upper half engagement slots are correspondingly combined to form the second engagement grooves.

4. The optical fiber adapter according to claim 2, wherein the first flanges are engaged with the first latching grooves to limit the positions of the optical fiber plugs in the front-and-rear direction; and the second flanges are engaged with the second engagement grooves to prevent the optical fiber plugs from rotating.

5. The optical fiber adapter according to claim 4, wherein the first flanges are capable of abutting against rear surfaces of the first latching grooves; and the second flanges are square flanges, and the peripheral profile of the second flanges exactly matches the inner profile of the second engagement grooves.

6. The optical fiber adapter according to claim 1, wherein the position fixing member is generally in the shape of a hollow cylinder, a front surface of the position fixing member is recessed to form a mounting groove thereon, a rear end of the position fixing cylinder is fixed in the mounting groove, a front end of the sleeve protrudes forward relative to the front end of the ferrule, and a front end of the position fixing cylinder also protrudes forward relative to the front end of the sleeve, wherein an inner wall front end of the position fixing cylinder tapers inward to prevent the sleeve from disengaging therefrom forward.

7. The optical fiber adapter according to claim 6, wherein a passage allowing the ferrule to passing therethrough from rear to front is formed in the middle of the position fixing member, and a rear surface of the position fixing member is recessed to form a mounting groove thereon; the optical fiber plug further comprises a rear cap abutting against the rear of the ferrule, and a front end of the rear cap is fixed in the mounting groove.

8. The optical fiber adapter according to claim 7, wherein the optical fiber plug further comprises a flexible tube wrapped around an outer periphery of the optical fiber, a fixing groove is formed on a rear surface of the rear cap, and a front end of the flexible tube is fixed in the fixing groove.

9. The optical fiber adapter according to claim 1, wherein the base and the fixing cap are both formed by using zinc alloy die casting, a groove is provided on the outer periphery of the base, and a conductive rubber strip is provided in the groove.

10. The optical fiber adapter according to claim 1, wherein a fixing hole is provided in the middle of the fixing cap passing therethrough in the top-and-down direction, and the fixing cap can be locked to the base by means of a fastener inserted and disposed in the fixing hole.

11. The optical fiber adapter according to claim 1, wherein a locking protrusion protruding outward is provided on both sides of the base, and a locking hole is provided on each of the locking protrusions passing therethrough in an up-down direction.

12. The optical fiber adapter according to claim 1, wherein the base is provided with a plurality of pairs of accommodating cavities arranged side by side; a plurality of fixing caps is provided, and each fixing cap is configured to fix one pair of optical fiber plugs.

13. The optical fiber adapter according to claim 1, wherein a recess is provided on one side of the base, and a protruding portion matching the recess is correspondingly provided on the other side thereof.

14. The optical fiber adapter according to claim 13, wherein the bottom of the base is provided with at least one fixing hole.

* * * * *